(12) United States Patent
Watanabe et al.

(10) Patent No.: US 7,252,878 B2
(45) Date of Patent: Aug. 7, 2007

(54) HIGH BARRIER FLEXIBLE PACKAGING STRUCTURE

(75) Inventors: Hiroaki Watanabe, North Kingstown, RI (US); Mark S. Lee, North Kingstown, RI (US)

(73) Assignee: Toray Plastics (America), Inc., N. Kingstown, RI (US)

( * ) Notice: Subject to any disclaimer, the term of this patent is extended or adjusted under 35 U.S.C. 154(b) by 211 days.

(21) Appl. No.: 10/684,595

(22) Filed: Oct. 15, 2003

(65) Prior Publication Data

US 2004/0131868 A1   Jul. 8, 2004

Related U.S. Application Data

(60) Provisional application No. 60/420,338, filed on Oct. 23, 2002.

(51) Int. Cl.
*B32B 15/08* (2006.01)

(52) U.S. Cl. .................. 428/336; 428/337; 428/451; 428/458; 428/461; 428/463; 428/475.8; 428/476.3; 428/483; 428/520

(58) Field of Classification Search ............. 428/336, 428/337, 451, 458, 461, 463, 475.8, 476.3, 428/483, 520
See application file for complete search history.

(56) References Cited

U.S. PATENT DOCUMENTS

| 4,297,187 | A | | 10/1981 | Deguchi et al. | |
|---|---|---|---|---|---|
| 5,112,673 | A | * | 5/1992 | Sawada et al. | 428/216 |
| 5,370,937 | A | * | 12/1994 | Lee et al. | 428/448 |
| 5,491,023 | A | | 2/1996 | Tsai et al. | |
| 5,688,556 | A | | 11/1997 | Wagner, Jr. | |
| 5,770,301 | A | * | 6/1998 | Murai et al. | 428/213 |
| 5,827,615 | A | | 10/1998 | Touhsaent et al. | |
| 6,165,571 | A | * | 12/2000 | Lykke | 428/35.8 |
| 6,500,559 | B2 | * | 12/2002 | Hofmeister et al. | 428/474.4 |
| 6,723,431 | B2 | * | 4/2004 | Mallory et al. | 428/418 |
| 6,740,394 | B2 | * | 5/2004 | Jacobsen et al. | 428/216 |

OTHER PUBLICATIONS

Moosheimer et al., "Permeation of Oxygen Moisture Through Vacuum Web Coated Films," $42_{nd}$ *Annual Technical Conference Proceedings* 408-414. Year: 1999.

* cited by examiner

*Primary Examiner*—D. S. Nakarani
(74) *Attorney, Agent, or Firm*—Morrison & Foerster LLP

(57) ABSTRACT

The invention relates to a high oxygen barrier, multilayer flexible packaging structure having a vacuum metallized, biaxially oriented polypropylene (met-BOPP) or metallized polyester (met-PET) film substrate; a high barrier EVOH layer coextruded or laminated directly on the metal-containing layer; and optionally an adjacent layer of anhydride modified polyolefin such as blend of LDPE, or MDPE, or PP and maleic anhydride modified adhesive resin on the EVOH layer.

21 Claims, No Drawings

HIGH BARRIER FLEXIBLE PACKAGING STRUCTURE

FIELD OF INVENTION

This invention relates to the formation of a high barrier flexible packaging structure that involves extrusion coating or extrusion lamination of ethylene vinyl alcohol (EVOH) and a vacuum coated metallized barrier film substrate.

BACKGROUND

The barrier property of a multilayer flexible packaging structure, in general, follows the following equation:

$$P^{-1} = P_1^{-1} + P_2^{-1} + P_3^{-1} + \ldots P_n^{-1} \qquad (1)$$

Where P is total barrier of the multilayer flexible structure and $P_1 \ldots P_n$ are barrier values for respective layer in the structure.

Ethylene vinyl alcohol (EVOH) has been one of the most effective barrier materials known to the flexible packaging industries, especially in providing excellent barrier for oxygen and aroma. However, the polar EVOH is not compatible with the non-polar polyolefinic film such as biaxially oriented polypropylene (BOPP). Thus, it requires an adhesion promoter or tie-layer resin such as anhydride-modified polyolefin in order to adhere to a non-polar polyolefinic substrate. Additionally, EVOH loses its barrier property if it is exposed to a high moisture environment. Therefore, it requires a moisture barrier layer for protection such as an anhydride-modified polyolefin or other non-polar layer or metallized layer.

U.S. Pat. No. 5,491,023 discloses a metallized film composition that is made in three steps: (1) coextruding a 3-layer composition of PP-tie/PP/sealant which is machine-direction oriented and flame treated, where PP-tie refers to a maleic anhydride modified propylene homopolymer or copolymer layer, (2) in-line extrusion coating with polyvinyl alcohol (PVOH) and further transverse-direction orienting and flame treating, and (3) vacuum metallizing onto the PVOH layer surface. The film composition can be described as: Aluminum/PVOH/maleic anhydride modified PP/PP/sealant. The oxygen barrier of the film was reported to be 0.37 cc/m$^2$/day measured at 73° F. 0% RH.

U.S. Pat. No. 5,688,556 discloses a barrier film structure formed by vapor depositing a barrier coating on an coextruded film substrate such as (1) amorphous nylon or (2) EVOH/PP-tie/polymeric layer, of which the barrier layer of amorphous nylon or EVOH has a surface exposed for coating. The vapor depositing barrier coating could be an inorganic coating such as $SiO_x$, $Al_2O_3$ and mixtures thereof, or an organic coating such as amorphous carbon coating. The barrier film composition can be described as vapor barrier coating/EVOH (or amorphous nylon)/PP-tie/PP (or PE, or biaxially oriented Nylon).

In the best example of U.S. Pat. No. 5,688,556, the EVOH layer was 0.06 mil (or 1.5 micron) thick, the oxygen barriers of above structure were 0.31 cc and 2.95 cc/m$^2$/day depending on vapor deposition time of 22.5 or 11.25 seconds, respectively, for coated EVOH-OPP film. Without coating, 1.5 micron EVOH containing 48 mol. % of ethylene provided oxygen barrier of approximately 20 cc/m$^2$/day at 73° F., 0% RH.

U.S. Pat. No. 5,827,615 discloses a metallized film substrate having a core layer and a metal receiving skin layer of ethylene vinyl alcohol (EVOH). The EVOH surface is metallized with aluminum. A low temperature sealable layer is coated to the aluminum surface. For the adhesion of EVOH, the core layer may either be blend with a maleic anhydride modified polyolefin or have an adhesion-promoting tie layer. According to the example, the film substrate of 2.13 mils (54.1 microns) containing 3 ga (0.75 micron) of EVOH layer, had oxygen barrier of 0.017 cc/100 in$^2$/day (or 0.26 cc/m$^2$/day) measured at 73° F., 0% RH. EVOH cited in this example 48 mol. % of ethylene, which is to that used in U.S. Pat. No. 5,688,556. This film substrate can be described as core layer/tie layer/EVOH/metal (aluminum)/sealant.

Moosheimer and H. Langowski in 42$^{nd}$ Annual Technical Conference Proceeding of 1999 Society of Vacuum Coaters describe a high barrier flexible structure. The structure consists of a vacuum-coated inorganic barrier layer such as Al, $AlO_x$, or $SiO_x$, and a high barrier lamination adhesive such as ORMOCER® to enhance the barrier property. ORMOCER® is a family of hybrid polymers made by sol-gel processing with inorganic and organic structural units to form network structure at temperature below 150° C., according to the text published in aforementioned conference proceeding by the leading author of K. H. Haas, et al. Four types of bifunctional monomers are used for synthesis of ORMOCER® polymers. The inorganic network is mainly based on Si—O—Si bonds using organically modified Si-alkoxices $R_xSi(OR)_y$, as starting compounds. Depending on the coating processes, organic network monomers may be a UV-crosslinking type or a thermal-crosslinking type. Typically hydrolysis and condensation reactions, by adding water and catalysts, occurred to form the crosslinking network structure that gives barrier and adhesion to film substrates. Typical ORMOCER® film thickness is in the range of 4 to 15 microns.

In short, the present state of the art of BOPP multilayer film applies EVOH coating alone on PP or with a metallized coating on the EVOH coating. Another commercial structure applies a sandwich structure EVOH/PE/Al on a BOPP layer where the Al layer is in contact with the BOPP layer, in which the EVOH is not directly contacting the Al layer. Neither of these structures provides an adequate oxygen barrier properties for long-term packaging of food products. There is a need in food packing applications where the oxygen barrier properties of the multilayer film should be substantially better than the barrier properties of either EVOH or aluminum metallized on an EVOH film.

SUMMARY OF THE INVENTION

The Applicants unexpectedly found that applying an EVOH layer directly onto a metallized layer which in turn, is deposited on a BOPP layer provides exceptionally good barrier properties in a multilayer BOPP film. This unique configuration of EVOH on the metallized aluminum layer unexpectedly provides a synergistic high barrier for the extrusion coated flexible structure.

One embodiment of this invention is a laminate film, comprising a biaxially oriented polymer film substrate; a metal-containing layer; and an EVOH layer coextruded or laminated directly on the metal-containing layer. Preferably, the metal-containing layer is a metal layer, a metal oxide layer or combinations thereof and the metal oxide is aluminum oxide, silicon oxide or combinations thereof. Also, the metal-containing layer comprises aluminum. In one variation, the metal-containing layer is a vacuum metallized layer. The metal-containing layer could have an optical density of about 1.5 to 5.0. The substrate could be discharge-treated in an atmosphere of $CO_2$ and $N_2$.

In one embodiment, the polymer film comprises a polymer selected from the group consisting of polyolefin, polyester, polyamide and combinations thereof. Preferably, the polymer film comprises polyolefin.

In another embodiment, the laminate film further comprises an adjacent layer of anhydride modified polyolefin on the EVOH layer. Preferably, the adjacent layer comprises a blend of a polyolefin resin and maleic anhydride modified adhesive resin, wherein the polyolefin resin is a low density polyethylene, a medium density polyethylene, polypropylene or combination thereof.

In yet another, the laminate film further comprises a second film layer on the adjacent layer, the second film layer comprising polypropylene, poly(ethylene terephthalate), or combination thereof. The second film layer could be vacuum metallized or non-metallized. Further variation includes a second barrier layer directly on the EVOH layer, the second barrier layer comprising a material selected from the group consisting of amorphous nylon and PVDC.

The laminate film preferably has a oxygen transmission rate of 0.5 $cc/m^2/day$ or less, more preferably 0.35 $cc/m^2/day$ or less and most preferably 0.2 $cc/m^2/day$ or less.

In yet another embodiment, the laminate film could further comprise a heat sealable layer or winding layer comprising an antiblock component selected from the group consisting of amorphous silicas, aluminosilicates, sodium calcium aluminum silicate, a crosslinked silicone polymer and polymethylmethacrylate. Preferably, the heat-sealable layer or winding layer has a thickness of about 0.5 to 5.0 μm and the substrate has a thickness of about 6 to 40 μm.

A method of manufacturing a laminate film, comprising extruding a biaxially oriented polymer film substrate; applying a metal-containing layer on the substrate; applying a coextruded or laminated EVOH layer directly on the metal-containing layer; applying an adjacent layer of anhydride modified polyolefin on the EVOH layer and applying a second film layer on the adjacent layer, the second film layer comprising polypropylene, poly(ethylene terephthalate), or combination thereof.

As will be realized, this invention is capable of other and different embodiments, and its details are capable of modifications in various obvious respects, all without departing from this invention. Accordingly, the description is to be regarded as illustrative in nature and not as restrictive.

DETAILED DESCRIPTION OF THE INVENTION

This invention relates to multilayer coextrusion of EVOH and optionally at least one adjacent layer of modified polyolefin for extrusion coating or lamination. Additionally, the vacuum coated barrier film substrate is specifically a metallized, biaxially oriented polymeric film, preferably polypropylene (met-BOPP), where "met" refers to metallized, or a metallized polyester (met-PET), where "PET" refers to poly(ethylene terephthalate), but could as well be cast polypropylene, nylon, biaxially oriented nylon.

Preferably, the multilayer coextrusion comprises one layer of EVOH and an adjacent outer layer on the EVOH layer of anhydride modified polyolefin such as the blend of low density polyethylene (LDPE), or medium density polyethylene (MDPE), or polypropylene (PP), and an adhesive resin such as maleic anhydride modified polyolefin. Of which the EVOH layer could be directly extruded onto the metallized surface of the film substrate. Additional barrier layers such as amorphous nylon, poly(vinylidene chloride) i.e., PVDC, and the like, can be coextruded with EVOH and the modified polyolefinic layers in aforementioned multilayer coextrusion. A second film layer that is either metallized and surface printed or non-metallized but reverse printed, can be laminated by the aforementioned multilayer coextrusion. The complete multilayer flexible packaging structure, either extrusion coated or extrusion laminated, could be used for packaging food products or other industrial applications with excellent shelf-life or barrier protection.

This invention takes advantage of the affinity between the vacuum coated aluminum layer and BOPP (or BOPET). In one embodiment, EVOH is coextruded onto the aluminum surface directly to overcome the incompatibility between EVOH and bare polypropylene (or PET). Furthermore, the coextrusion of an adjacent layer on the EVOH layer of a blend of LDPE and anhydride modified polyolefin provides moisture protection to the EVOH layer. The resultant multilayer flexible structure is far superior to the prior art multilayer BOPP films in terms of barrier properties. The specific outer film substrates and/or the adhesion modified LDPE layer could be compliant with the U.S. Food and Drug Administration regulations. Then, the resultant multilayer flexible structure, either extrusion coated or extrusion-laminated, could be used for food packaging applications.

This invention relates to forming an extrusion coated or laminated multilayer flexible structure that possesses excellent barrier for moisture, oxygen and aroma protection. In one embodiment, the present invention relates to a high barrier, multilayer flexible packaging structure comprising:

(1) a vacuum metallized, biaxially oriented polypropylene (met-BOPP) or metallized polyester (met-PET) film substrate;

(2) a high barrier EVOH layer coextruded or laminated directly on the metal-containing layer;

(3) an adjacent layer of anhydride modified polyolefin such as blend of LDPE, or MDPE, or PP and maleic anhydride modified adhesive resin on the EVOH layer;

(4) a second film layer on the adjacent layer, the second film layer being either vacuum metallized or non-metallized BOPP or PET for extrusion lamination; and (5) optionally further including barrier layers such as amorphous nylon, PVDC and the like, coextruded/laminated with the EVOH layer for barrier enhancement.

The resultant flexible packaging structure provides excellent barrier for moisture, oxygen and aroma protection. It is intended for food packaging and industrial packaging applications.

The examples use the following commercial products, which are described generically as follows:

(1) PWX2® is a BOPP film of a polypropylene homopolymer core, one adjacent metal adhesion promoting skin layer and a heat sealable skin layer opposite to the metal adhesion layer. Prior to vacuum metallization, the metal adhesion promoting skin layer surface is corona treated in a controlled atmosphere of $N_2$ and $CO_2$ as disclosed in U.S. Pat. No. 4,297,187. PWX2® is vacuum coated with aluminum vapor to a nominal optical density of 2.4. The thickness of the aluminum layer is approximately 300-500 angstroms. The metallized PWX2® BOPP film has typical oxygen barrier of 22 $cc/m^2/day$ measured at 73° F., 0% RH.

(2) YH12® is a clear non-metallized BOPP film substrate that could be used as the base film for PWX2®.

(3) F61W® is a clear non-metallized BOPP film substrate. F61W® has a polypropylene homopolymer core and one adjacent heat sealable skin layer. Either YH12® or F61W® may have an optional skin layer opposite to the heat sealable layer for lamination, or coating, or printing. With such a two-layer construction, the homopolymer core layer surface is corona treated in a controlled atmosphere of $N_2$ and $CO_2$ as described above. Both YH12® and F61W® have typical oxygen barrier of greater than 2,000 $cc/m^2/day$ measured at 73° F., 0% RH. The corona treatment in aforementioned controlled atmosphere of $N_2$ and $CO_2$ is specially suitable for vacuum coating, or vacuum metallization, or lamination, or printing, etc., due to enhanced surface tension of the film substrate. Optionally, the second skin layer of both F61W® and PWX2®, opposite to the corona treated surface, could be a heat sealable layer.

(4) Chevron 1017® is a low-density polyethylene (LDPE).

(5) Mitsui AT1000A® is a 50-60 wt. % maleic anhydride modified LLDPE adhesive resin.

(6) Evalca®, namely E105B, C109B and J102B, whose properties are shown in Table 1:

TABLE 1

Properties of Evalca ®.

| | | E105B | C109B | J102B |
|---|---|---|---|---|
| EVALCA ® EVOH | | | | |
| Ethylene | mol % | 44% | 35% | 32% |
| Melt Index | g/10 min. | 5.5 | 9 | 2 |
| Density | g/cc | 1.14 | 1.18 | 1.17 |
| Melting Point | degree C. | 165 | 179 | 183 |
| Barrier | | | | |
| Oxygen (@68° F., 0% RH) | cc/m2/day | 1.24 | 0.43 | 0.47 |
| Moisture (@100° F., 90% RH) | g/m2/day | 1.4 | 2.8 | 3.8 |

* Barrier values are based on 1 mil thick film substrates.

One metallized PWX2® and two non-metallized clear BOPP film substrates, namely, YH12® and F61W®, all 17.5 microns thick, were selected from Toray Plastics (America), Inc. product lines.

Three commercial EVOH from Evalca®, namely E105B, C109B and J102B, were selected for the extrusion. Preferably, a 80/20 wt. % blend of C109B and J102B could be used for synergy barrier properties. The low melt-index Evalca® J102B also beneficially generated higher extrusion back pressure for uniform extrusion exiting the die.

The anhydride modified polyolefin was a 90/10 wt. % blend of Chevron 1017® low density polyethylene(LDPE) and Mitsui AT1000A®. The suggested concentration of AT1000A® adhesion resin in the blend is 10-20 wt. %. The coextrusion lamination film test structures are illustrated below in Table 2.

TABLE 2

Film Structures of Examples and Comparative Examples.
Coextrusion Lamination Flexible Film Test Sturctures

| Example 1 | Example 2 | Comparable Example 1 | Comparable Example 2 | Comparable Example 3 | Comparable Example 4 |
|---|---|---|---|---|---|
| F61W | F61W | F61W | F61W | F61W | F61W |
| PE | PE | PE | PE | EVOH(44% Et.) | EVOH(35% Et.) |
| EVOH(44% Et.) | EVOH(35% Et.) | EVOH(44% Et.) | EVOH(35% Et.) | PE | PE |
| Al | Al | | | Al | Al |
| PWX2 | PWX2 | YH12 | YH12 | PWX2 | PWX2 |

EVOH (44% Et.) = Evalca E105B
EVOH (35% Et.) = 80% Evalca C109B/20% Evalca J102B The coextrusion lamination was carried out at an extrusion line having two extruders, namely 3.5" and 2" extruders, a two-layer feed block and a flex-lip slot die. The extrusion configuration was arranged in which the EVOH layer was onto the nip roller and the modified LDPE (mod-LDPE) layer was onto the chill roller of the laminator, respectively. Two unwinders fed the film substrates to the laminator nip, respectively. The lamination coextrusion line was further equipped with in-line corona treater, edge trimmer, a rewinder, and two gauge scanners for scanning one of the in-feed film substrates and the finish laminated structure.

The thickness of the coextruded modified-LDPE layer was approximately 15 microns and was extruded at 575° F. The EVOH layer was approximately 2.5 microns, and was extruded at 525° F. The extrusion line speed was 325 ft/min. Higher extrusion temperatures for either layer may cause polymer degradation and gel formation. Higher extrusion speed caused extrusion melt-curtain disruption. Two rolls of clear F61W® were used to assess the extrusion layer thickness, lamination bond, and layer uniformity at the startup. Thereafter, the metallized PWX2® and YH12® were placed on the unwinders alternatively to produce various laminated structures as described below.

EXAMPLE 1

The laminated flexible structure was made with aforementioned metallized PWX2® and a clear non-metallized F61W®, both 17.5-micron thick, BOPP film substrates by multilayer coextrusion lamination of the modified-LDPE and EVOH layers. The metallized PWX2® film had its metallized surface facing the coextruded EVOH layer. The treated surface of F61W® faced the modified-LDPE layer as illustrated in Table 2. The EVOH layer was Evalca® E105B that consisted of 44 mol. % of ethylene. The thickness of the resulting laminated structure was approximately 53.5-55 microns. The extruded EVOH and modified-LDPE layers were approximately 2.5 and 15 microns, respectively. The resulting multilayer coextrusion laminated flexible structure could be described as: F61W/15 microns modified-LDPE/ 2.5 microns EVOH/aluminum/PWX2.

EXAMPLE 2

The laminated flexible structure was made as in Example 1 but the EVOH layer comprised a blend of 80 wt. % Evalca® C109B and 20 wt. % of Evalca® J102B where Evalca® C109B and J102B consisted of 35 mol. % and 32 mol. % of ethylene, respectively.

COMPARATIVE EXAMPLE 1

The laminated flexible structure was made with two non-metallized, 17.5-micron YH12® and F61W® BOPP film substrates as described in Example 1. The treated surfaces of these YH12® and F61W® were facing the extruded EVOH and modified-LDPE, respectively. The EVOH layer was Evalca® E105B consisting of 44 mol. % of ethylene. The thickness of the resulting laminated structure was approximately 53.5-55 microns, of which the extruded EVOH and modified-LDPE layers were approximately 2.5 and 15 microns, respectively. The resulting multilayer coextrusion laminated flexible structure could be described as: F61W/15 microns modified-LDPE/2.5 microns EVOH/YH12.

COMPARATIVE EXAMPLE 2

The laminated flexible structure was made as in Comparative Example 1 but the EVOH layer comprised a blend of 80 wt. % of Evalca® C109B and 20 wt. % of Evalca® J102B, where Evalca® C109B and J102B consisted of 35 mol. % and 32 mol. % of ethylene, respectively.

COMPARATIVE EXAMPLE 3

The laminated flexible structure was made as in Example 1, of which the metallized PWX2® film had its metallized surface facing the coextruded modified-LDPE layer, and the treated surface of the clear non-metallized F61W® faced the EVOH layer. The resulting multilayer coextrusion-laminated flexible structure could be described as: F61W/2.5 microns EVOH/15 microns modified-LDPE/aluminum/PWX2.

COMPARATIVE EXAMPLE 4

The laminated flexible structure was made as in Comparative Example 3 but the EVOH layer comprised a blend of 80 wt. % Evalca® C109B and 20 wt. % of Evalca® J102B, where Evalca® C109B and J102B consisted of 35 mol. % and 32 mol. % of ethylene, respectively.

COMPARATIVE EXAMPLE 5

A commercial, laminated flexible structure for packaging potato chips had its metallized film as described in U.S. Pat. No.: 5,827,615. The laminated flexible structure could be described as: BOPP/print/LDPE/aluminum/EVOH/PE-tie/PP, where PE-tie is typically a maleic anhydride modified LDPE resin. The thickness of above structure was approximately 67.5 microns.

COMPARATIVE EXAMPLE 6

A commercial, laminated flexible structure for packaging potato chips was made with a multilayer coextrusion, of which the EVOH was sandwiched in between two PE-tie layers. The thickness of the laminated flexible packaging structure was approximately 53 microns. The multilayer coextrusion laminated flexible structure could be described as: BOPP/print/PE-tie/EVOH/PE-tie/aluminum/BOPP.

Barrier Properties

The barrier properties of the films of Examples and Comparative Examples were measured as follows:

A) Oxygen transmission rate of the film was measured by using a Mocon Oxtran 2/20 unit substantially in accordance with ASTM D3985. In general, the preferred value was an average value equal to or less than 0.5 cc/m$^2$/day, preferably less than 0.35 cc/m$^2$/day.

B) Moisture transmission rate of the film could be measured by using a Mocon Permatran 3/31 unit measured substantially in accordance with ASTM F1249. In general, the preferred value was an average value equal to or less than 0.155 g/m$^2$/day with a maximum of 0.70 g/m$^2$/day.

Table 3 shows the oxygen barrier properties of laminated flexible packaging structures including those of Examples and Comparative Examples. As shown in Table 3, the laminated flexible packaging structures of Examples 1 and 2 had excellent oxygen barrier compared to all comparative films. In particular, the oxygen barrier properties of Examples 1 and 2 are unexpectedly far superior to those one would expect by calculation or estimation. The moisture barrier properties of the films of Examples 1 and 2 are also expected to be better than those of the films of Comparative Examples and the cited prior art in Table 3.

TABLE 3

Oxygen Barrier Properties of Laminated Flexible Packaging Structures.

| (cc/m2/day) | Calculated or estimated | Actual |
| --- | --- | --- |
| Comparative Example 1 | | 23.7 |
| Comparative Example 2 | | 4.44 |
| Comparative Example 3 | 11.41 | 4.64 |
| Comparative Example 4 | 3.69 | 2.164 |
| Example 1 | 11.41 | 0.166 |
| Example 2 | 3.69 | 0.135 |
| Comparative Example 5 | estimated 7.47 | 0.26-0.47 |
| Comparative Example 6 | estimated 5.76 | 5-8 |
| U.S. Pat. No. 5,491,023 | aluminum/PVOH coated PP | 0.37 cc |
| U.S. Pat. No. 5,688,556 | amorphous carbon coating/EVOH | 0.31-2.95 cc |

This application discloses several numerical ranges in the text and figures. The numerical ranges disclosed inherently support any range or value within the disclosed numerical ranges even though a precise range limitation is not stated verbatim in the specification because this invention can be practiced throughout the disclosed numerical ranges.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

What is claimed is:

1. A laminate film, comprising, in this order:
   a biaxially oriented polymer film substrate;
   a metal-containing layer; and
   an EVOH layer directly on the metal-containing layer, wherein said metal-containing layer has an optical density of about 1.5 to 5.0.

2. The laminate film of claim 1, wherein the polymer film comprises a polymer selected from the group consisting of polyolefin, polyester, polyamide and combinations thereof.

3. The laminate film of claim 1, wherein the polymer film comprises polyolefin.

4. The laminate film of claim 1, wherein the metal-containing layer is a vacuum metallized layer.

5. The laminate film of claim 1, further comprising an adjacent layer of anhydride modified polyolefin on the EVOH layer.

6. The laminate film of claim 5, wherein the adjacent layer comprises a blend of a polyolefin resin and maleic anhydride modified adhesive resin, wherein the polyolefin resin is a low density polyethylene, a medium density polyethylene, polypropylene or combination thereof.

7. The laminate film of claim 5, further comprising a second film layer on the adjacent layer, the second film layer comprising polypropylene, poly(ethylene terephthalate), or combination thereof.

8. The laminate film of claim 7, wherein the second film layer is vacuum metallized or non-metallized.

9. The laminate film of claim 7, further comprising a second barrier layer directly on the EVOH layer, the second barrier layer comprising a material selected from the group consisting of amorphous nylon and PVDC.

10. The laminate film of claim 1, wherein the structure has a oxygen transmission rate of 0.5 cc/m$^2$/day or less.

11. The laminate film of claim 1, wherein the structure has a oxygen transmission rate of 0.35 cc/m$^2$/day or less.

12. The laminate film of claim 1, wherein the structure has a oxygen transmission rate of 0.2 cc/m$^2$/day or less.

13. The laminate film of claim 1, further comprising:
    a heat sealable layer or winding layer comprising an antiblock component selected from the group consisting of amorphous silicas, aluminosilicates, sodium calcium aluminum silicate, a crosslinked silicone polymer and polymethylmethacrylate.

14. The laminate film of claim 13, wherein said heat-sealable layer or winding layer has a thickness of about 0.5 to 5.0 μm.

15. The laminate film of claim 1, wherein said substrate has a thickness of about 6 to 40 μm.

16. The laminate film of claim 1, wherein said substrate is discharge-treated in an atmosphere of $CO_2$ and $N_2$.

17. The laminate film of claim 1, wherein the metal-containing layer comprises aluminum.

18. The laminate film of claim 1, wherein the metal-containing layer is a metal layer, a metal oxide layer or combinations thereof.

19. The laminate film of claim 18, wherein the metal oxide is aluminum oxide, silicon oxide or combinations thereof.

20. The laminate film of claim 1, wherein the EVOH layer is a extruded EVOH layer or a laminated EVOH layer.

21. A laminate film, consisting of:
    a biaxially oriented polymer film substrate;
    a metal-containing layer on the substrate; and
    an EVOH layer directly on the metal-containing layer, wherein said metal-containing layer has an optical density of about 1.5 to 5.0.

* * * * *